F. G. DIEFENDORF.
PIPE SCREWING DEVICE.
APPLICATION FILED MAR. 17, 1913.

1,150,178. Patented Aug. 17, 1915.

UNITED STATES PATENT OFFICE.

FREDERICK G. DIEFENDORF, OF ERIE, PENNSYLVANIA.

PIPE-SCREWING DEVICE.

1,150,178.  Specification of Letters Patent.  Patented Aug. 17, 1915.

Application filed March 17, 1913. Serial No. 754,663.

*To all whom it may concern:*

Be it known that I, FREDERICK G. DIEFENDORF, a citizen of the United States, residing at Erie, in the county of Erie and State of Pennsylvania, have invented new and useful Improvements in Pipe-Screwing Devices, of which the following is a specification.

This invention relates to pipe screwing devices and consists in certain improvements in the construction thereof as will be hereinafter fully described and pointed out in the claims. These devices are particularly designed for securing pipes together in trenches. In the modern method of securing such pipes together especially if the trench is deep, difficulty is encountered by reason of the fact that the range of movement permissible with the tongs used for this purpose is very slight so that to screw the pipes together under such conditions is very tedious and expensive.

The object of the present invention is to obviate this difficulty.

The invention is illustrated in the accompanying drawings as follows:—

Figure 1:
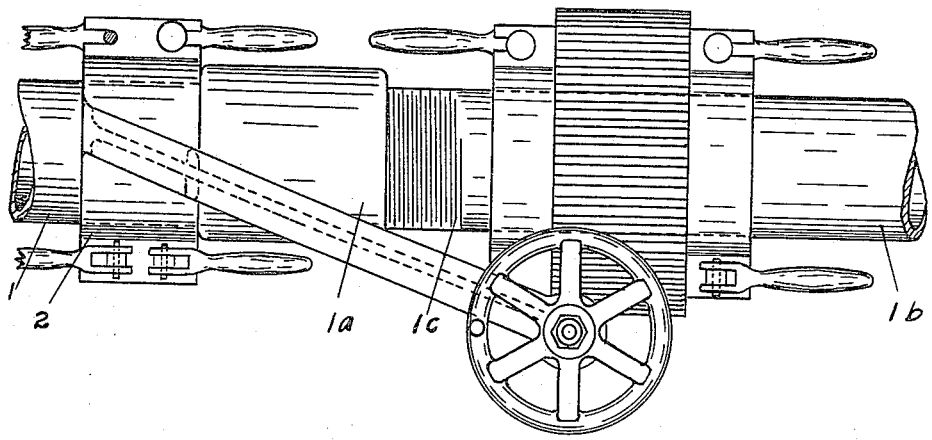
Figure 2:
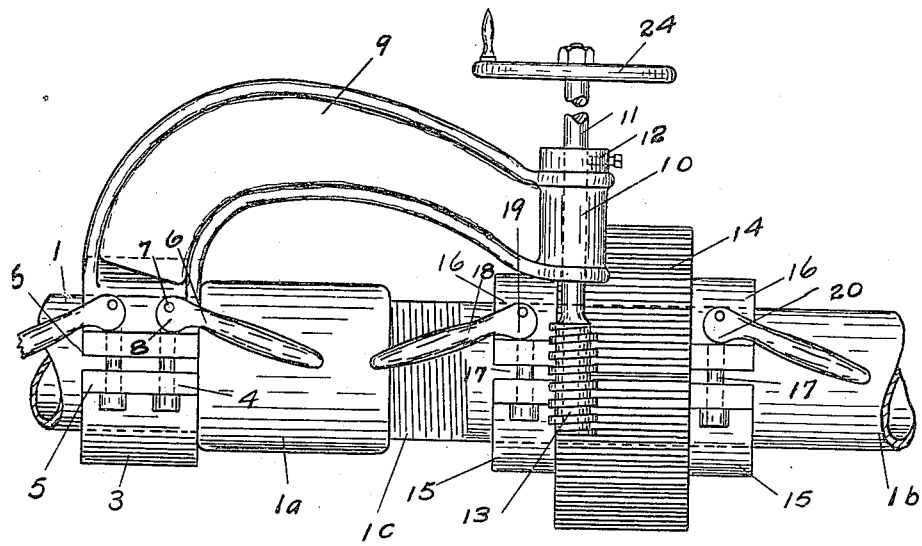

Figure 1 is a plan view of the device. Fig. 2 is a side elevation of the same.

1 marks the pipe already laid and $1^a$ a coupling on said pipe. A frame 2 forms one side of the clamp and the part 3 the opposite side of the clamp. These are connected by the bolts 4 extending through the ears 5—5 on the parts 2 and 3. The levers 6 are pivoted by means of the pins 7 in the tops of bolts and these have the cam surfaces 8. By swinging the levers so as to bring the cam surfaces into play the frame 2 can be rigidly clamped to the pipe 1. An arm 9 extends from the frame 2 to a position over the pipe $1^b$ which is the pipe which is being operated upon. The arm terminates in a bearing 10 in which the shaft 11 extends. A thrust collar 12 is arranged on this shaft and a worm 13 is formed on the lower end of the shaft. The worm 13 engages a worm gear 14. This gear 14 is split and provided with clamping flanges 15—15 16—16. The bolts 17 are arranged through these flanges and levers 18 are secured to the bolts by means of the pins 19. The levers have the cam surfaces 20 by the operation of which the two parts of the gear may be clamped to the pipe $1^b$.

The pipe $1^b$ has the screw thread $1^c$ which is intended to enter the coupling $1^a$. The shaft 11 is provided with a hand wheel 24 and may be of any length desired to carry the wheel 24 out of the trench. In operating the device the parts are clamped to the pipes and the end of the screw thread $1^c$ brought to position to enter the coupling $1^a$. By turning the hand wheel 24 the worm 13 may be made to operate on the gear 14 so as to rotate the pipe $1^b$, thus screwing the pipe $1^b$ in the coupling $1^a$. It will be noted that the gear 14 is of sufficient width to permit of the end movement necessary by reason of the end movement of the pipe $1^b$ as it enters the coupling $1^a$. The worm gives sufficient power to set up the pipe with little effort on the part of the workman and the rod 11 being extended above the trench makes the operation of the device possible in a convenient position.

What I claim as new is:—

1. In a pipe screwing device, the combination of a rotary gear; means for securing said gear to a first pipe; and means carried by the pipe to which the first pipe is to be secured for actuating said gear to rotate the first pipe with said gear, said means permitting the end movement of the first pipe as the screw advances.

2. In a pipe screwing device, the combination of a rotary gear; means for securing said gear to a first pipe; and means clamped to and carried by a pipe to which the first pipe is to be secured to sustain the torque in turning the first pipe for actuating said gear to rotate said first pipe with the gear, said means permitting an end movement of the pipe as the screw advances.

3. In a pipe screwing device, the combination of a rotary gear; means for clamping said gear on a first pipe; a frame carried by a second pipe to which the first pipe is to be secured; means for clamping said frame to said second pipe; and devices carried by said frame for actuating said gear, said devices permitting an end movement of the first pipe.

4. In a pipe screwing device, the combination of a rotary gear; means for securing the gear to a first pipe; a frame carried by a second pipe to which the first pipe is to be secured; means for securing said frame to said second pipe; and a worm gear carried by said frame and operating on said gear.

5. In a pipe screwing device, the combination of a rotary gear; means for securing the gear to a first pipe; a frame carried by a second pipe to which the first pipe is to be secured; means for securing said frame to said second pipe; a worm gear carried by said frame and operating on said gear; and a shaft extending from said worm to a distance from said pipe.

In testimony whereof I have hereunto set my hand in the presence of two subscribing witnesses.

FREDERICK G. DIEFENDORF.

Witnesses:
B. M. HARTMAN,
H. C. LORD.

Copies of this patent may be obtained for five cents each, by addressing the "Commissioner of Patents, Washington, D. C."